United States Patent
Sasidharan et al.

(10) Patent No.: US 11,122,510 B2
(45) Date of Patent: Sep. 14, 2021

(54) POWER AND NOTIFICATION MANAGEMENT FOR A WEARABLE DEVICE

(71) Applicant: Verizon Patent and Licensing Inc., Arlington, VA (US)

(72) Inventors: Shan K. Sasidharan, Chennai (IN); Rajesh M. Narayanan, Chennai (IN); Raghuram Ayalur Muralikrishnan, Chennai (IN); Venkateshwar Rao Sankenani, Hyderabad (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 682 days.

(21) Appl. No.: 14/722,785

(22) Filed: May 27, 2015

(65) Prior Publication Data
US 2016/0353386 A1  Dec. 1, 2016

(51) Int. Cl.
*H04W 52/02* (2009.01)
*H04B 1/3827* (2015.01)
*H04L 12/26* (2006.01)

(52) U.S. Cl.
CPC ........ *H04W 52/0264* (2013.01); *H04B 1/385* (2013.01); *H04L 43/08* (2013.01); *H04L 43/16* (2013.01); *H04W 52/027* (2013.01); *Y02D 30/70* (2020.08)

(58) Field of Classification Search
None
See application file for complete search history.

(56) References Cited

U.S. PATENT DOCUMENTS

| | | | | |
|---|---|---|---|---|
| 7,528,577 B2* | 5/2009 | Hara | ..................... | G06F 1/3203 320/132 |
| 7,684,834 B2* | 3/2010 | Kangas | ................. | H02J 7/0004 370/311 |
| 8,954,766 B2* | 2/2015 | Adams | .................. | G06F 1/3203 713/300 |
| 2008/0146292 A1* | 6/2008 | Gilmore | .............. | H04M 1/6066 455/572 |
| 2014/0362768 A1* | 12/2014 | Wood | .................... | H04L 67/322 370/328 |
| 2014/0364104 A1* | 12/2014 | Wood | .................... | H04W 4/001 455/418 |
| 2014/0370939 A1* | 12/2014 | Ritter | ................. | G01R 31/3648 455/572 |

(Continued)

FOREIGN PATENT DOCUMENTS

GB    2548011 A  *  6/2017

*Primary Examiner* — Willie J Daniel, Jr.

(57) ABSTRACT

A device may receive power management information associated with a wearable device. The power management information may identify a power management trigger associated with the wearable device, and the wearable device may be different from the device. The device may detect the power management trigger associated with the wearable device. The device may prevent, based on detecting the power management trigger, transmissions by the device to the wearable device. The transmissions may be associated with notifications for an application executing on the wearable device. The power management information may indicate that the device is to prevent the transmissions associated with the notifications for the application.

20 Claims, 12 Drawing Sheets

(56) References Cited

U.S. PATENT DOCUMENTS

| | | | | |
|---|---|---|---|---|
| 2015/0056920 A1* | 2/2015 | Huttunen | ................ | H04B 7/26 455/41.2 |
| 2015/0181531 A1* | 6/2015 | Zajac | .................... | G06F 1/3212 455/574 |
| 2016/0073351 A1* | 3/2016 | Cardozo | ........... | H04W 52/0258 455/574 |

* cited by examiner

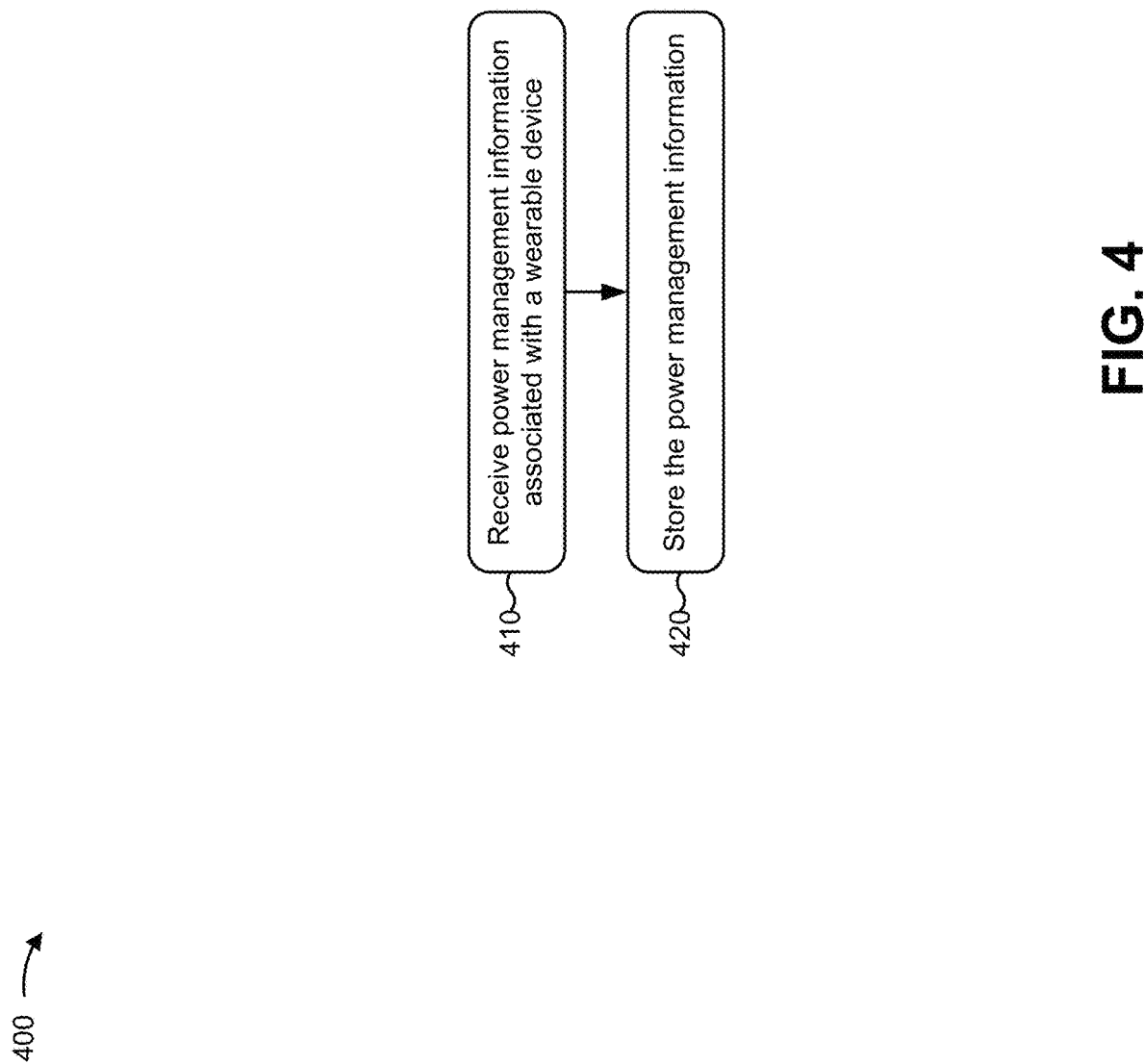

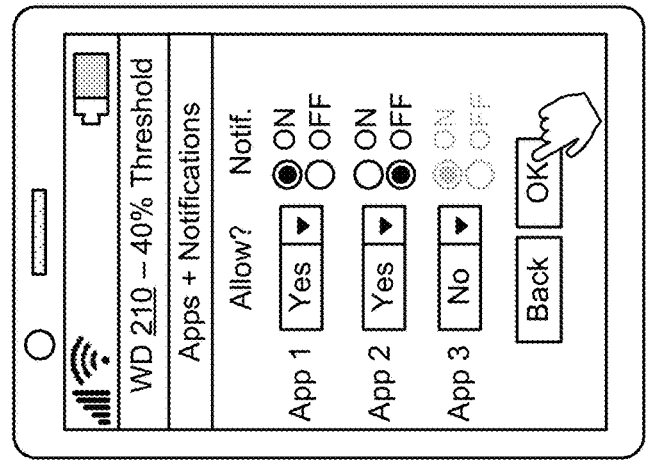
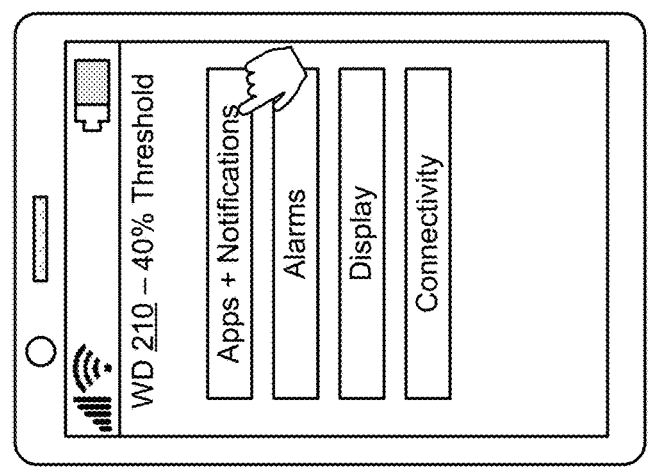
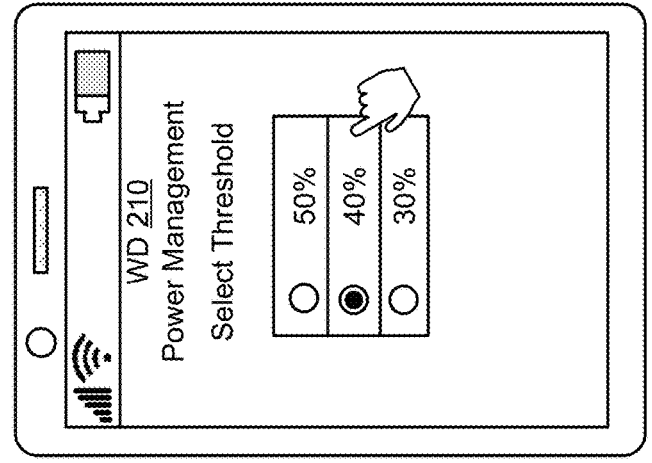
FIG. 5A

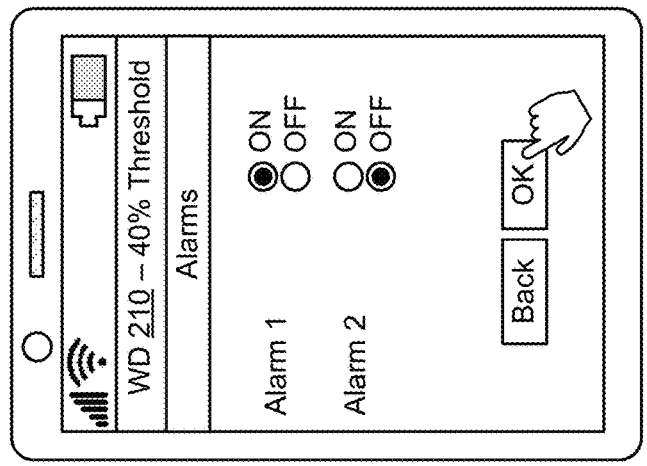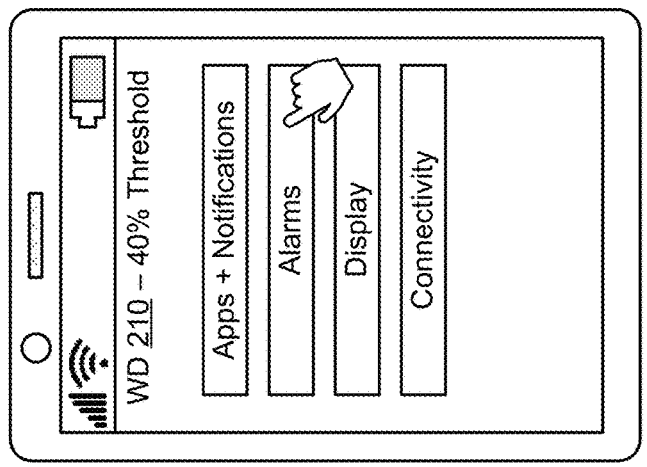
FIG. 5B

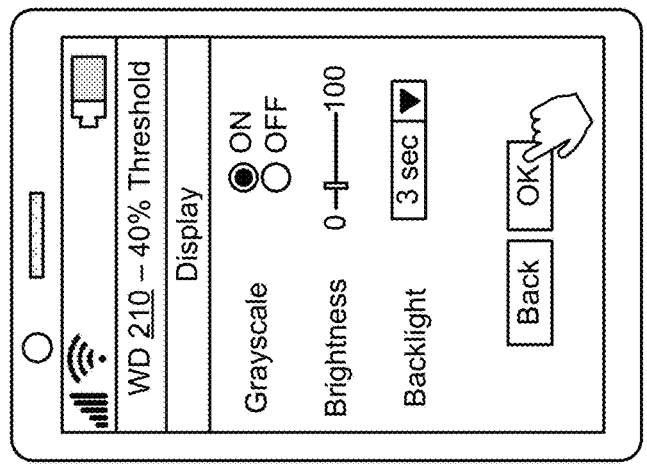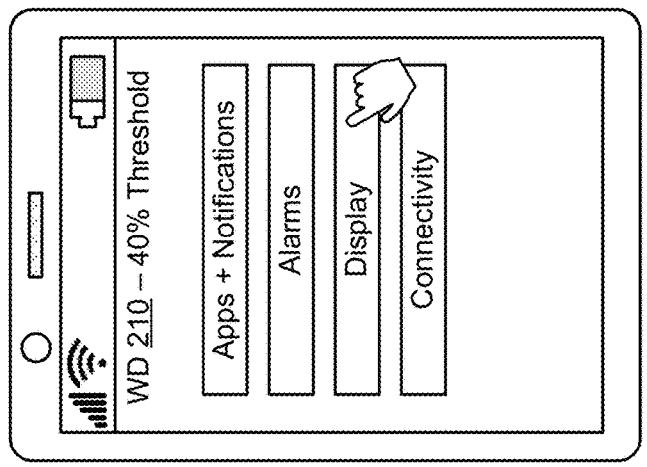
FIG. 5C

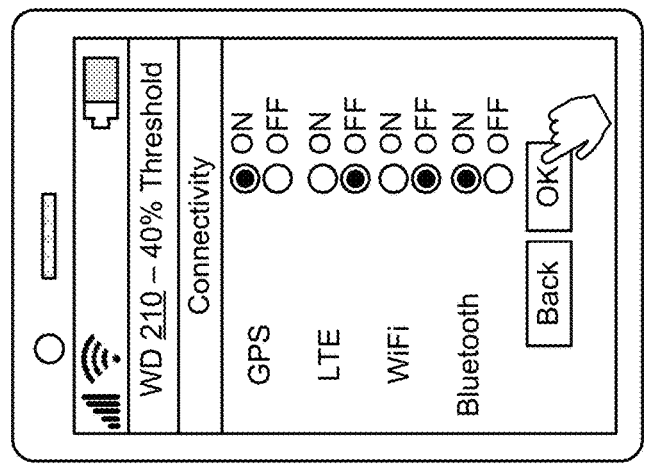
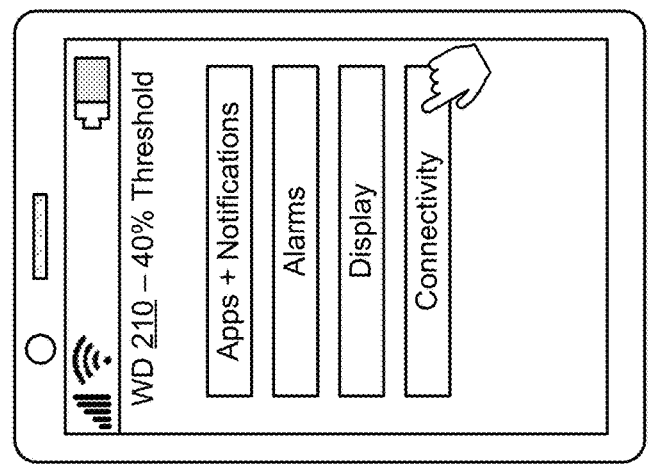
FIG. 5D

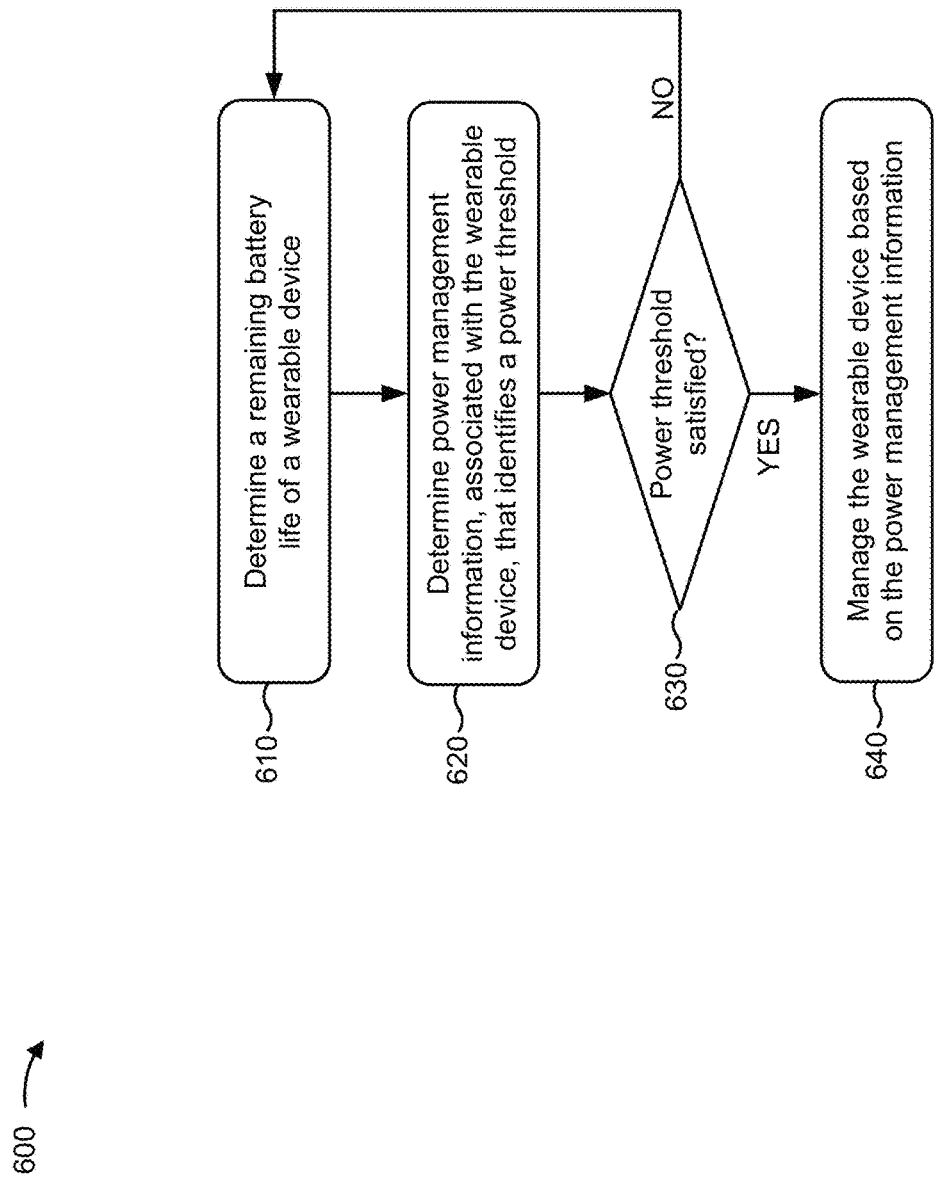

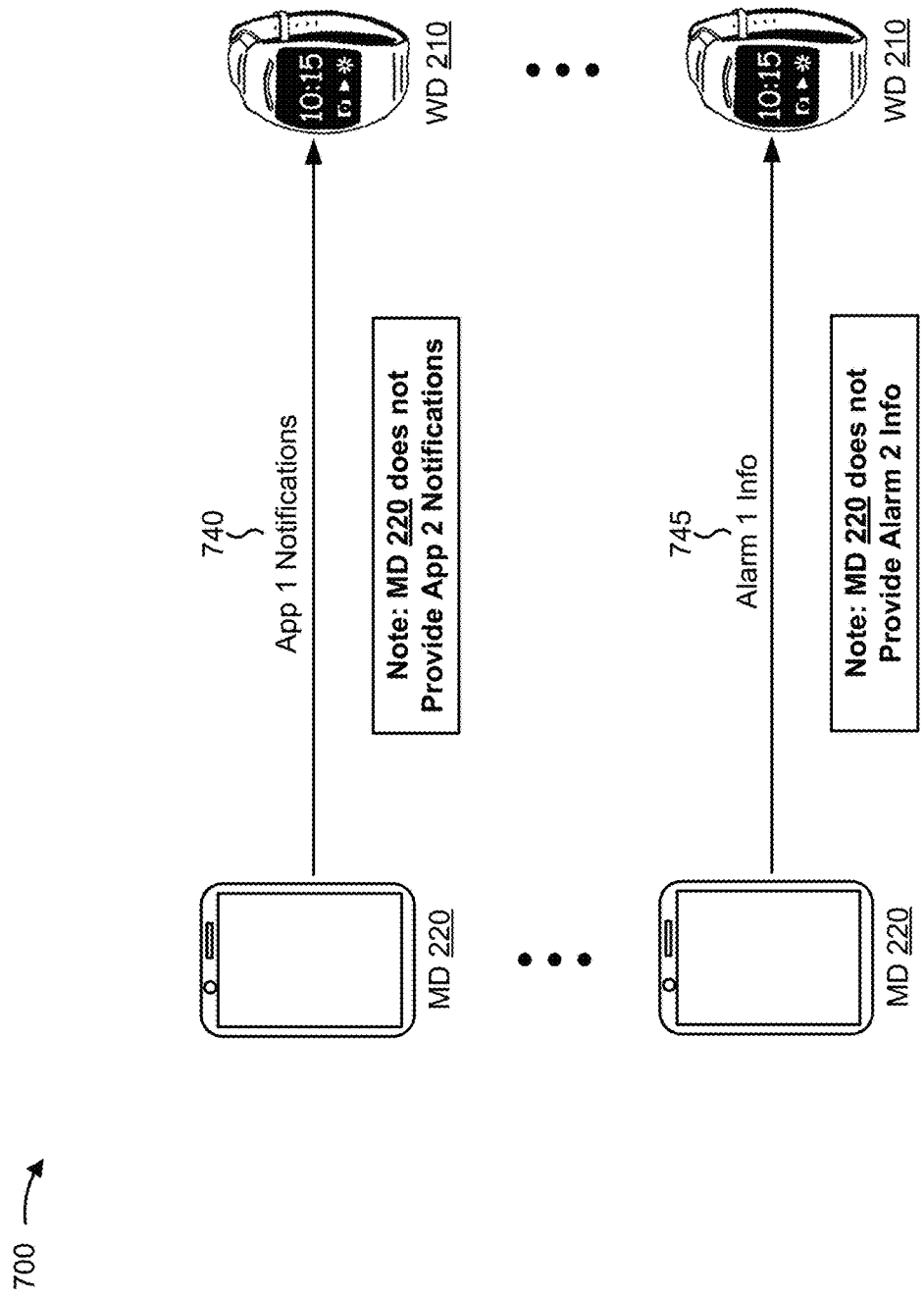

POWER AND NOTIFICATION MANAGEMENT FOR A WEARABLE DEVICE

BACKGROUND

A wearable device may include a device that is incorporated into an item that can be worn in and/or on the human body, such as an article of clothing, an accessory, or the like. In some cases, the wearable device may be capable of performing a task typically performed by another type of device (e.g., a smart phone, a mobile phone, a laptop computer, etc.) and/or a task that the other type of device does not typically perform (e.g., providing biofeedback, tracking a physiological function, etc.).

BRIEF DESCRIPTION OF THE DRAWINGS

FIG. 4 is a flow chart of an example process for receiving and storing power management information associated with a wearable device;

FIGS. 5A-5D are diagrams of an example implementation relating to the example process shown in FIG. 4;

FIG. 6 is a flow chart of an example process for managing power of a wearable device based on power management information associated with the wearable device; and FIGS. 7A-7C are diagrams of an example implementation relating to the example process shown in FIG. 6.

DETAILED DESCRIPTION OF PREFERRED EMBODIMENTS

Figure 1:
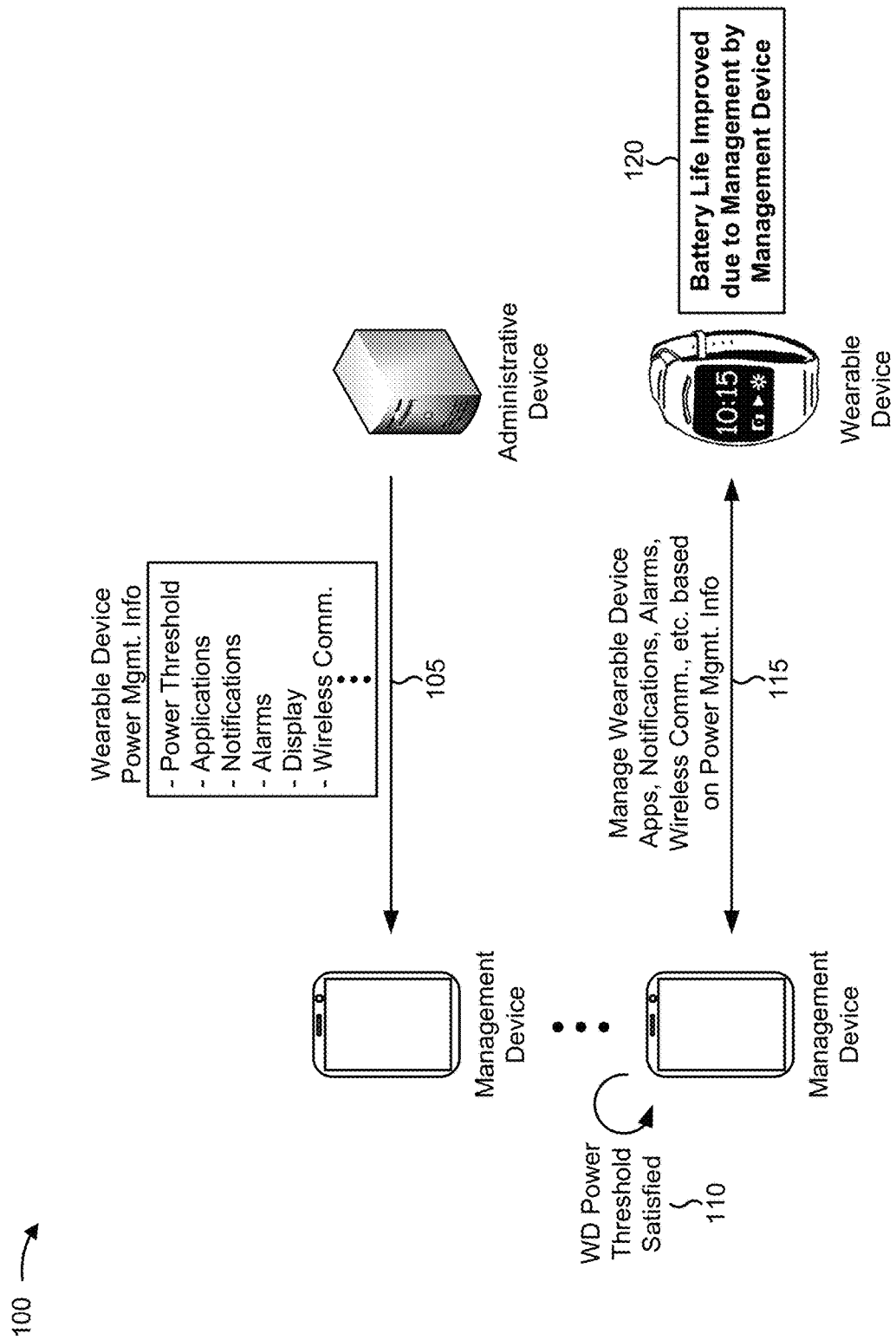
FIG. 1 is a diagram of an overview of an example implementation described herein.

The following detailed description of example implementations refers to the accompanying drawings. The same reference numbers in different drawings may identify the same or similar elements.

A wearable device may be capable of receiving information that is to be provided for viewing and/or sensing by a user. For example, the wearable device may receive, from a management device to which the wearable device is connected (e.g., a smart phone, a tablet, etc.), a notification (e.g., an application notification), an alarm, an incoming call (e.g., a voice call, a video call, etc.), a message (e.g., a short message service (SMS) message, a multimedia messaging service (MMS) message, an email, etc.) that is to be provided, via the wearable device, for viewing by the user. However, the wearable device may have a limited amount of available battery power, and the battery life of the wearable device may vary depending on a number of factors, such as an amount and/or frequency of information provided for viewing and/or sensing by the user, a number and/or type of applications executed by the wearable device, use of a display screen of the wearable device, wireless communications associated with the wearable device, or the like. In some cases, the battery life of the wearable device may be depleted even without knowledge of the user (e.g., when an unused application is executed by the wearable device, when an alarm is provided for a period of time, when a display screen is illuminated for a period of time, etc.).

In some scenarios, the wearable device may be associated with a field service operation in which the wearable device may be issued, by an organization, to assist a field technician associated with the field service operation. As such, it may be important to extend the battery life of the wearable device as long as possible in order to allow the field service technician to continuously and/or efficiently perform tasks associated with the field service operation. In some implementations, such improved battery life may be achieved by managing an amount of power consumed by the wearable device (e.g., when executing one or more applications, when providing the information for viewing and/or sensing by the user, when using the display screen, when wirelessly communicating, etc.).

Implementations described herein may relate to power management for a wearable device in order to improve a battery life of the wearable device (e.g., as compared to a battery life of the wearable device without power management). For example, the battery life of the wearable device may be increased by approximately 33%-40% based on implementing power management techniques described herein.

In some implementations, the battery life of the wearable device may be improved by managing applications, notifications, alarms, use of a display screen, wireless communications, or the like, associated with the wearable device. In some implementations, the power of the wearable device may be locally managed by a management device (e.g., connected to the wearable device) and/or remotely managed by an administrative device (e.g., via a network).

FIG. 1 is a diagram of an overview of an example implementation 100 described herein. For the purposes of example implementation 100 assume that a management device is capable of communicating with a wearable device (e.g., via a Bluetooth connection, via a WiFi connection, etc.). Further, assume that an administrative device, associated with the management device and the wearable device, stores or has access to power management information associated with managing power usage of the wearable device (e.g., such that a battery life of the wearable device may be improved).

As shown in FIG. 1, and by reference number 105, the management device may receive, from the administrative device, the power management information. As shown, the power management information may include information associated with a power threshold at which the management device is to begin managing the wearable device, information associated with managing applications that may be executed by the wearable device, information associated with managing notifications provided to the wearable device, information associated managing alarms provided to the wearable device, information associated with managing a display screen of the wearable device, information associated with managing wireless communications of the wearable device, or the like. As shown, in some implementations, the management device may receive the power management information from the administrative device. Additionally, or alternatively, the management device may receive the power management information based on user input provided by a user of the management device.

As further shown in FIG. 1 assume that the management device is connected to the wearable device. As shown by reference number 110, the management device may, at a later time and based on the power management information, determine that the power threshold is satisfied, indicating that the management device is to begin managing the wearable device based on the power management information. As shown by reference number 115, the management device may manage the wearable device in order to extend the battery life of the wearable device. For example, the management device may manage the wearable device by managing applications executed by the wearable device (e.g., causing the wearable device to execute only a particular set of applications, closing unused applications, prioritizing applications, etc.), managing notifications provided to the wearable device (e.g., such that only notifications of a particular type, associated with a particular application, or the like, are provided to the wearable device, etc.), managing alarms provided to the wearable device (e.g., such that information associated with only particular alarms are provided to the wearable device, etc.), managing the display screen of the wearable device (e.g., causing the display screen to display in grayscale only, adjusting a brightness configuration, modifying a backlight timer configuration, etc.), managing wireless communications of the wearable device (e.g., enabling the wearable device to communicate via a particular wireless technology, disabling the wearable device from communicating via another particular wireless technology, etc.). As noted by reference number 120, the battery life of the wearable device may be improved based on the management of the wearable device by the management device (e.g., as compared to the battery life without management by the management device). In this way, power management for a wearable device may be implemented to improve a battery life of the wearable device.

Figure 2:
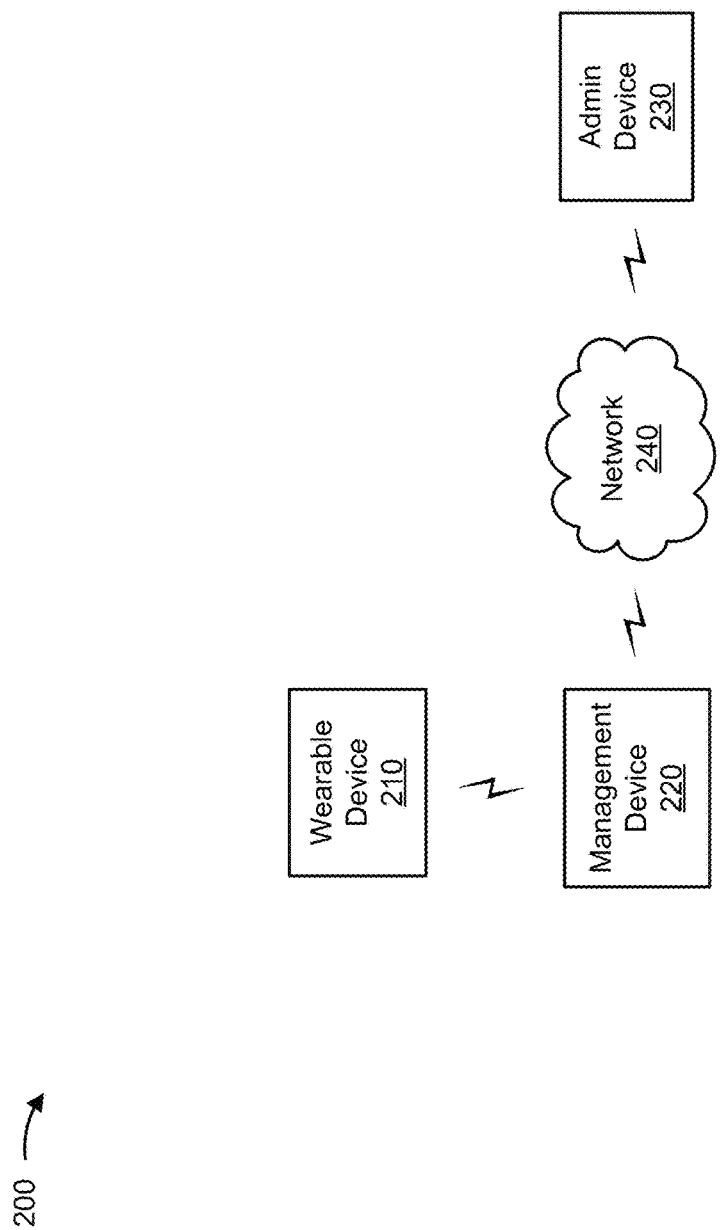
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a wearable device 210, a management device 220, an administrative device 230, and a network 240. Devices of environment 200 may interconnect via wired connections, wireless connections, or a combination of wired and wireless connections.

Wearable device 210 may include a device that is incorporated into an item that can be worn on and/or inserted in to the human body. For example, wearable device 210 may include a smart wristwatch, a pair of smart eyeglasses, an ear piece, or the like. In some implementations, wearable device 210 may be capable of receiving information from and/or providing information to a user of wearable device 210. Additionally, or alternatively, wearable device 210 may be capable of communicating with management device 220. For example, wearable device 210 may be capable of communicating with management device 220 via a Bluetooth connection, via a near field communication (NFC) connection, via a WiFi connection, or the like. Additionally, or alternatively, wearable device 210 may be managed by management device 220. For example, management device 220 may manage wearable device 210 based on power management information associated with managing power usage of wearable device 210, as described below.

Management device 220 may include a device capable of managing wearable device 210 based on power management information, associated with wearable device 210, in order to improve a battery life of wearable device 210. For example, management device 220 may include a communication and/or computing device, such as a mobile phone (e.g., a smart phone, a radiotelephone, etc.), a laptop computer, a tablet computer, a handheld computer, a gaming device, or a similar type of device. In some implementations, management device 220 may be capable of communicating with wearable device 210 and/or administrative device 230.

Administrative device 230 may include a device capable of receiving, generating, providing, validating, and/or storing power management information associated with wearable device 210. For example, administrative device 230 may include a server device or a collection of server devices. In some implementations, administrative device 230 may be capable of communicating with management device 220 in order to provide power management information associated with wearable device 210 and/or to validate power management information associated with wearable device 210.

Network 240 may include one or more wired and/or wireless networks. For example, network 240 may include a cellular network (e.g., a long-term evolution (LTE) network, a 3G network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
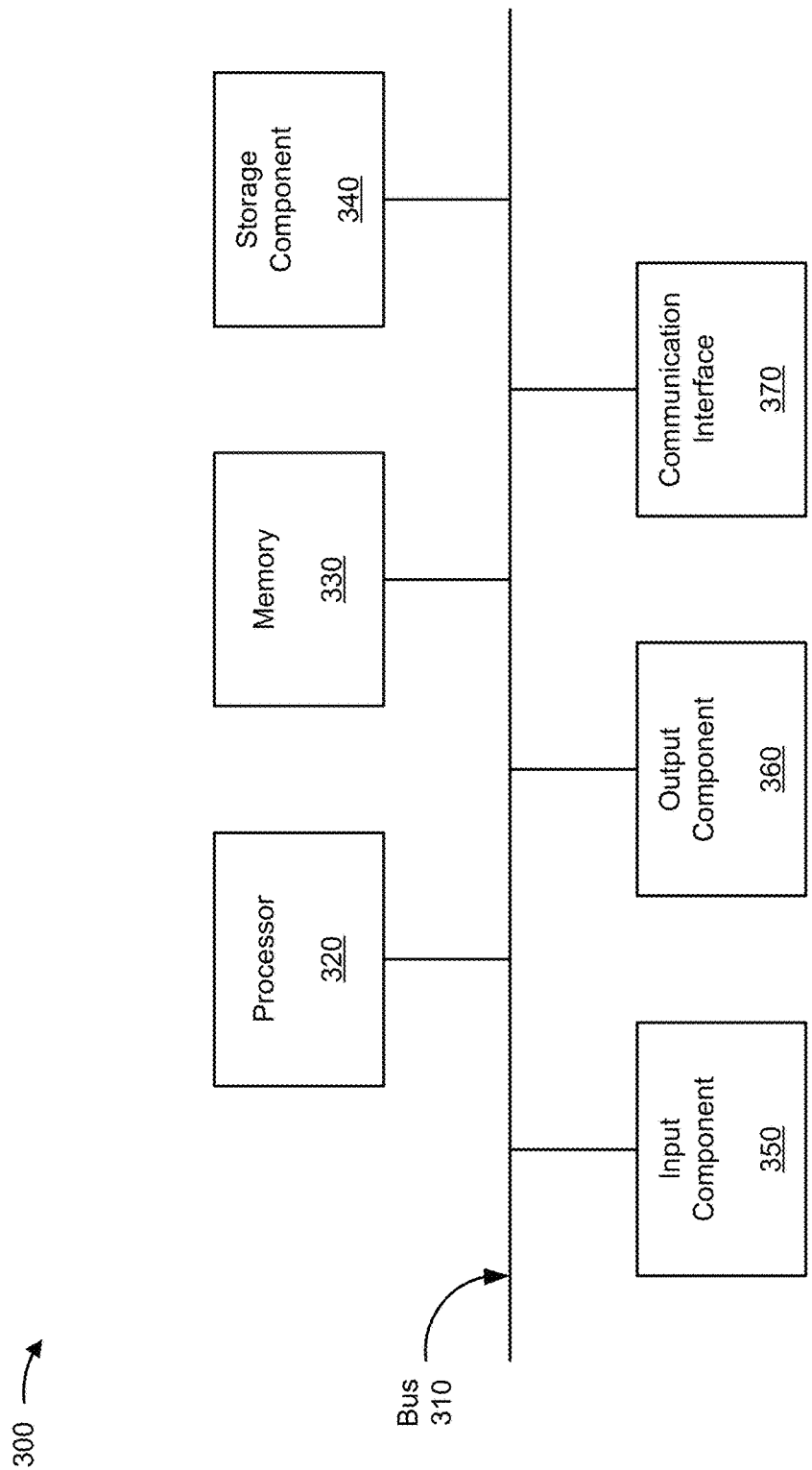
FIG. 3 is a diagram of example components of one or more devices of FIG. 2.

FIG. 3 is a diagram of example components of a device 300. Device 300 may correspond to wearable device 210, management device 220, and/or administrative device 230. In some implementations, wearable device 210, management device 220, and/or administrative device 230 may include one or more devices 300 and/or one or more components of device 300. As shown in FIG. 3, device 300 may include a bus 310, one or more processors 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) capable of being programmed to perform a function. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for receiving and storing power management information associated with managing power of a wearable device. In some implementations, one or more process blocks of FIG. 4 may be performed by management device 220. In some implementations, one or more process blocks of FIG. 4 may be performed by another device or a set of devices separate from or including management device 220, such as administrative device 230.

As shown in FIG. 4, process 400 may include receiving power management information associated with a wearable device (block 410). For example, management device 220 may receive power management information associated with wearable device 210. In some implementations, management device 220 may receive the power management information when a user of management device 220 provides input associated with the power management information. Additionally, or alternatively, management device 220 may receive the power management information when another device provides the information, such as administrative device 230.

The power management information may include information associated with managing power used by wearable device 210. In other words, the power management information may include information that may be used to manage operations of wearable device 210 such that a battery life of wearable device 210 may be improved (e.g., as compared to a battery life without managing power usage of wearable device 210). In some implementations, the power management information may include information associated with managing applications associated with wearable device 210, notifications associated with wearable device 210, alarms associated with wearable device 210, display configurations of wearable device 210, wireless communications of wearable device 210, or the like, as described in further detail below.

In some implementations, the power management information may include information associated with managing an application associated with wearable device 210. For example, the power management information may include information that identifies whether an application is a designated application. Here, if the application is a designated application, then management device 220 may allow wearable device 210 to continue executing the application (e.g., after management device 220 determines that management device 220 is to manage wearable device 210). Alternatively, if the application is not a designated application, then management device 220 may cause wearable device 210 to stop executing the application in order to manage power used by wearable device 210.

As another example, the power management information may include information that identifies an application priority associated with a set of applications. As a particular example, assume that wearable device 210 is capable of executing a first application, a second application, and a third application. Further, assume that the power management information indicates that the third application has a first (e.g., highest) priority, the second application has a second (e.g., middle) priority, and that the first application has a third (e.g., lowest) priority. In this example, when a remaining battery life of wearable device 210 is at or near 0%, then management device 220 may cause the first application, the second application, and the third application to be closed based on the application priority. In other words, management device 220 may cause the first application to be closed first, the second application to be closed second, and the third application to be closed last.

Additionally, or alternatively, the power management information may include information associated with managing notifications provided to wearable device 210. For example, assume that management device 220 is capable of providing notifications, associated with an application, to wearable device 210 in order to cause wearable device 210 to provide the notification for display to the user. Here, the power management information may include information indicating that management device 220 is not to provide any notifications, associated with the application, to wearable device 210. As another example, the power management information may include information indicating that management device 220 is to provide only a particular type of notification to wearable device 210 (e.g., such that management device 220 may provide a first type of notification, associated with the application, to wearable device 210, but may disable a second type of notification, associated with the application, to wearable device 210). In some implementations, the power management information associated with managing notifications may be application specific. In other words, the power management information may indicate that management device 220 is to manage notifications provided to wearable device 210 differently for a first application than for a second application and/or a third application. In some implementations, the notification may be associated with an application, a message (e.g., a SMS message, a MMS message, an email message, etc.), a call (e.g., an incoming video call, an incoming voice call, etc.), or the like.

Additionally, or alternatively, the power management information may include information associated with managing alarms provided to wearable device 210. For example, assume that management device 220 is capable of providing information associated with an alarm (i.e., alarm information) to wearable device 210 in order to cause wearable device 210 to provide the alarm for viewing (e.g., via a display screen) and/or sensing (e.g., by playing an audible tone, by causing wearable device 210 to vibrate, etc.) by the user. Here, the power management information may include information indicating that management device 220 is not to provide any alarm to wearable device 210. As another example, the power management information may include information indicating that management device 220 is to provide only a particular alarm to wearable device 210, such as a designated alarm, a priority alarm, an alarm associated with a particular type of event, or the like. In some implementations, an alarm may include a notification associated with an alarm application. As such, an alarm, as described herein, may be referred to as a notification.

Additionally, or alternatively, the power management information may indicate that the alarm is to be provided by wearable device 210 in a particular manner. For example, the power management information may indicate that wearable device 210 is to provide the alarm for a particular period of time (e.g., such that wearable device 210 vibrates and/or displays the alarm for only 10 seconds, 30 seconds, one minute, etc.), using a particular technique (e.g., via vibration and audible tone only, via the display screen only, etc.), or the like.

Additionally, or alternatively, the power management information may include information associated with managing a display configuration of wearable device 210. For example, the power management information may include information indicating that management device 220 is to cause wearable device 210 to display information (e.g., via a display screen of wearable device 210) in gray tones only (e.g., rather than using a full set of colors that wearable device 210 is capable of displaying). As another example, the power management information may include information indicating that management device 220 is to modify a brightness configuration of wearable device 210 (e.g., such that the brightness of the display screen is reduced). As yet another example, the power management information may include information indicating that management device 220 is to modify a backlight timer configuration of wearable device 210 (e.g., such that a time period during which the display screen of wearable device 210 is illuminated may be decreased).

Additionally, or alternatively, the power management information may include information associated with managing wireless communications of wearable device 210. For example, the power management information may include information indicating that management device 220 is to enable or disable a wireless communication method via which wearable device 210 is capable of sending and/or receiving information, such as GPS, 3G, LTE, WiFi, Bluetooth, NFC, or the like.

In some implementations, the power management information may be associated with a power threshold. For example, the power management information may be associated with a power threshold at which management device 220 is to begin managing wearable device 210 based on the power management information, such as 10% remaining battery life, 30% remaining battery life, 50% remaining life, or the like. In some implementations, the power management information may include information associated with multiple power thresholds. For example, the power management information may include power management information that corresponds to a 10% remaining battery life threshold and power management information that corresponds to a 30% remaining battery life threshold. Here, each power threshold, of the multiple power thresholds, may be associated with corresponding power management information, and management device 220 may manage wearable device 210 accordingly. As an example, management device 220 may manage wearable device 210 based on the power management information that corresponds to the 30% remaining battery life threshold when the battery life of wearable device 210 is less than or equal to 30% and is greater than 10%, and may manage wearable device 210 based on the power management information that corresponds to the 10% remaining battery life threshold when the battery life of wearable device 210 is less than or equal to 10%.

Additionally, or alternatively, the power management information may include information that identifies wearable device 210 with which the power management information is associated (e.g., when management device 220 may be connected to multiple wearable devices 210). For example, the power management information may include a name of wearable device 210, an identification number of wearable device 210, a type of wearable device 210, or the like. Here, management device 220 may manage each wearable device 210 based on the corresponding power management information. As such, the power management information may vary between different wearable devices 210, which may allow each wearable device 210 to be managed in accordance with needs of the user of wearable device 210.

In some implementations, management device 220 may receive the power management information based on user input. For example, management device 220 may receive, via a touch screen of management device 220, user input associated with the power management information. Additionally, or alternatively, management device 220 may receive the power management information from administrative device 230. For example, administrative device 230 may receive (e.g., from a user associated with monitoring and/or managing multiple wearable devices 210) the power management information, and administrative device 230 may provide the power management information to management device 220. In this way, power usage of wearable device 210 may be remotely managed by administrative device 230 without requiring administrative device 230 to establish a direct connection with wearable device 210.

In some implementations, second received power management information may modify and/or override first received power management information. For example, assume that a user of management device 220 provides first power management information via management device 220. Here, if administrative device 230 provides (e.g., at a later time) second power management information, then the second power management information may override the first power management information. In some implementations, the user of management device 220 may or may not be capable of modifying and/or overriding power management information provided by administrative device 230.

Additionally, or alternatively, management device 220 may receive updated power management information. For example, management device 220 may receive (e.g., based on user input) power management information associated with wearable device 210. Here, the user may modify the power management information (e.g., when the user edits power management information, adds power management information, deletes power management information, etc.) to create the updated power management information.

As further shown in FIG. 4, process 400 may include storing the power management information (block 420). For example, management device 220 may store the power management information. In some implementations, management device 220 may store the power management information after management device 220 receives the power management information. Additionally, or alternatively, management device 220 may store the power management information when management device 220 receives an indication that management device 220 is to store the power management information from another device, such as administrative device 230.

In some implementations, management device 220 may store the power management information in a memory location (e.g., a RAM, a ROM, a cache, a hard disk, etc.) of management device 220. In some implementations, management device 220 may store the power management information such that previous power management information (e.g., power management information received by management device 220 at an earlier time) is supplemented, modified, overwritten, deleted, or the like. Additionally, or alternatively, management device 220 may store the power management information such that management device 220 may retrieve the power management information at a later time (e.g., when determining whether management device 220 is to manage wearable device 210, when managing wearable device 210 based on the power management information).

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIGS. 5A-5D are diagrams of an example implementation 500 relating to example process 400 shown in FIG. 4. For the purposes of example implementation 500, assume that management device 220 is capable of connecting to wearable device 210, and that a user of management device 220 wishes to cause management device 220 to manage wearable device 210 in order to improve a battery life of wearable device 210.

As shown by the left portion of FIG. 5A, management device 220 may provide, for display to the user, a user interface associated with power management information that identifies a power threshold at which management device 220 is to manage wearable device 210. As shown, management device 220 may receive (e.g., based on a user selection of a 40% button) power management information indicating that management device 220 is to manage wearable device 210 when wearable device 210 has 40% remaining battery life or less.

As shown by the center portion of FIG. 5A, management device 220 may receive (e.g., based on a user selection of an Apps+Notifications button) an indication that the user wishes to input power management information associated with managing applications executed by wearable device 210 and notifications provided to wearable device 210.

As shown by the right portion of FIG. 5A, management device 220 may provide, for display to the user, a user interface associated with power management information for managing applications and notifications. As shown, management device 220 may receive (e.g., based on user input) power management information for a group of three applications (e.g., App 1, App 2, and App 3) associated with wearable device 210. The power management information for a first application (e.g., App 1) may include information indicating that management device 220 is to allow wearable device 210 to execute the first application when wearable device 210 has 40% remaining battery life or less. The power management information may also indicate that management device 220 is to provide notifications, associated with the first application, to wearable device 210 when wearable device 210 has 40% remaining battery life or less.

As further shown, the power management information for a second application (e.g., App 2) may include information indicating that management device 220 is to allow wearable device 210 to execute the second application when wearable device 210 has 40% remaining battery life or less. The power management information may also indicate that management device 220 is not to provide notifications, associated with the second application, to wearable device 210 when wearable device 210 has 40% remaining battery life or less.

As also shown, the power management information for a third application (e.g., App 3) may include information indicating that management device 220 is not to allow wearable device 210 to execute the third application when wearable device 210 has 40% remaining battery life or less. In other words, the power management information may indicate that management device 220 is to cause wearable device 210 to stop executing the third application (i.e., close App 3) when wearable device 210 has 40% remaining battery life or less. As shown, management device 220 may determine (e.g., based on a user selection of an OK button) that the user is finished providing power management information associated with applications and notifications associated with wearable device 210.

Managing the applications and the notifications in this way may cause wearable device 210 to use an amount of power that is less than an amount of power that may be used by wearable device 210 without managing the applications and/or the notifications.

As shown by the left portion of FIG. 5B, management device 220 may receive (e.g., based on a user selection of an Alarms button) an indication that the user wishes to input power management information associated with managing alarms provided to wearable device 210.

As shown by the right portion of FIG. 5B, management device 220 may provide, for display to the user, a user interface associated with power management information for managing alarms provided to wearable device 210. As shown, management device 220 may receive (e.g., based on user input) power management information for a group of two alarms (e.g., Alarm 1 and Alarm 2) associated with wearable device 210. The power management information for a first alarm (e.g., Alarm 1) may indicate that management device 220 is to provide information associated with the first alarm to wearable device 210 when wearable device 210 has 40% remaining battery life or less (e.g., to cause wearable device 210 to display information associated with the alarm, to play an alarm tone, to vibrate, etc.). As further shown, the power management information for a second alarm (e.g., Alarm 2) may indicate that management device 220 is not to provide information associated with the second alarm to wearable device 210 when wearable device 210 has 40% remaining battery life or less (e.g., such that wearable device 210 does not display information associated with the alarm, play an alarm tone, vibrate, etc.). As shown, management device 220 may determine (e.g., based on a user selection of an OK button) that the user is finished providing power management information associated with the alarms associated with wearable device 210. Managing the alarms in this way may cause wearable device 210 to use an amount of power that is less than an amount of power that may be used by wearable device 210 without managing the alarms.

As shown by the left portion of FIG. 5C, management device 220 may receive (e.g., based on a user selection of a Display button) an indication that the user wishes to input power management information associated with managing a display provided by wearable device 210.

As shown by the right portion of FIG. 5C, management device 220 may provide, for display to the user, a user interface associated with power management information for managing the display provided by wearable device 210. As shown, management device 220 may receive (e.g., based on user input) power management information indicating that management device 220 is to cause wearable device 210 to switch to a grayscale mode when wearable device 210 has 40% remaining battery life or less. In some implementations, use of the grayscale mode may cause a display screen of wearable device 210 to display information using gray tones only, rather than a full set of color tones that wearable device 210 may be capable of displaying. Displaying information using the grayscale mode may cause wearable device 210 to use an amount of power that is less than an amount of power that may be used by wearable device 210 when displaying information using the full set of color tones.

As further shown, management device 220 may receive (e.g., based on user input) power management information indicating that management device 220 is to adjust a brightness configuration of wearable device 210 when wearable device 210 has 40% remaining battery life or less. As further shown, management device 220 may also receive (e.g., based on user input) power management information indicating that management device 220 is to modify a backlight timer configuration of wearable device 210 (e.g., to three seconds) when wearable device 210 has 40% remaining battery life or less. Managing the brightness and the backlight timer in this way may cause wearable device 210 to use an amount of power that is less than an amount of power that may be used by wearable device 210 without managing the brightness and and/or the backlight timer. As shown, management device 220 may determine (e.g., based on a user selection of an OK button) that the user is finished providing power management information associated with the display provided by wearable device 210.

As shown by the left portion of FIG. 5D, management device 220 may receive (e.g., based on a user selection of a Connectivity button) an indication that the user wishes to input power management information associated with managing wireless communications of wearable device 210.

As shown by the right portion of FIG. 5D, management device 220 may provide, for display to the user, a user interface associated with power management information for managing the wireless communications of wearable device 210. As shown, management device 220 may receive (e.g., based on user input) power management information indicating that management device 220 is to allow wearable device 210 to send and/or receive information via a GPS connection when wearable device 210 has 40% remaining battery life or less, prevent wearable device 210 from sending and/or receiving information via a LTE connection when wearable device 210 has 40% remaining battery life or less, prevent wearable device 210 from sending and/or receiving information via a WiFi connection when wearable device 210 has 40% remaining battery life or less, and allow wearable device 210 to send and/or receive information via a Bluetooth connection when wearable device 210 has 40% remaining battery life or less. Managing the wireless communications of wearable device 210 in this way may cause wearable device 210 to use an amount of power that is less than an amount of power that may be used by wearable device 210 without the wireless communications of wearable device 210.

As shown, management device 220 may determine (e.g., based on a user selection of an OK button) that the user is finished providing power management information associated with the wireless communications of wearable device 210. Management device 220 may store the power management information associated with wearable device 210 accordingly (e.g., such that management device 220 may retrieve the power management information at a later time).

As indicated above, FIGS. 5A-5D are provided merely as examples. Other examples are possible and may differ from what was described with regard to FIGS. 5A-5D. For example, while FIGS. 5A-5D are described in the context of management device 220 receiving the power management information based on input from a user of management device 220, in some implementations, management device 220 may receive the power management information in another manner, such as by receiving the power management information from administrative device 230.

FIG. 6 is a flow chart of an example process 600 for managing power of a wearable device based on power management information associated with the wearable device. In some implementations, one or more process blocks of FIG. 6 may be performed by management device 220. In some implementations, one or more process blocks of FIG. 6 may be performed by another device or a set of devices separate from or including management device 220, such as administrative device 230.

As shown in FIG. 6, process 600 may include determining a remaining battery life of a wearable device (block 610). For example, management device 220 may determine a remaining battery life of wearable device 210. In some implementations, management device 220 may determine the remaining battery life of wearable device 210 when (e.g., after, concurrently with, etc.) management device 220 establishes a connection with wearable device 210. Additionally, or alternatively, management device 220 may determine the remaining battery life of wearable device 210 when management device 220 receives an indication that management device 220 is to determine the remaining battery life of wearable device 210.

In some implementations, management device 220 may determine the remaining battery life of wearable device 210 based on management device 220 establishing a connection with wearable device 210. For example, management device 220 may be capable of communicating with wearable device 210 via a Bluetooth connection, a WiFi connection, an NFC connection, or the like. Here, management device 220 may determine the remaining battery life by sending, to wearable device 210, a request for information that identifies the remaining battery life, and determining the remaining battery life based on a response to the request.

In some implementations, management device 220 may determine the remaining battery life of wearable device 210 when management device 220 connects to wearable device 210, such as during establishment of the connection, immediately after the establishment of the connection, or the like. Additionally, or alternatively, management device 220 may determine the remaining battery life of wearable device 210 at another time based on a configuration of management device 220. For example, management device 220 may be configured to periodically determine the remaining battery life of wearable device 210 after the connection between management device 220 and wearable device 210 is established, such as every five minutes, every 30 minutes, every one hour, or the like, and management device 220 may determine the remaining battery life accordingly.

Additionally, or alternatively, management device 220 may determine the remaining battery life based on an indication provided by a user of management device 220. For example, management device 220 may receive user input indicating that management device 220 is to determine the remaining battery life (e.g., in order to determine whether management device 220 is to begin managing wearable device 210), and management device 220 may determine the remaining battery life accordingly.

Additionally, or alternatively, management device 220 may determine the remaining battery life based on an indication provided by administrative device 230. For example, administrative device 230 may send (e.g., automatically, based on user input, etc.), to management device 220, information indicating that management device 220 is to determine the remaining battery life of wearable device 210, and management device 220 may determine the remaining battery life accordingly. In this way, wearable device 210 may be remotely managed by administrative device 230.

In some implementations, information that identifies the remaining battery life of wearable device 210 may be used to determine whether management device 220 is to manage wearable device 210 based on power management information associated with wearable device 210, as described below. The information that identifies the remaining battery life may include information that indicates how much battery capacity is used or how much battery capacity remains (e.g., as a percentage of a full capacity), information that indicates an amount of time until the battery is empty, or the like.

As further shown in FIG. 6, process 600 may include determining power management information, associated with the wearable device, that identifies a power threshold (block 620). For example, management device 220 may determine power management information, associated with wearable device 210, that identifies a power threshold. In some implementations, management device 220 may determine the power management information when (e.g., before, after, concurrently with, etc.) management device 220 determines the remaining battery life of wearable device 210. Additionally, or alternatively, management device 220 may determine the power management information when (e.g., after, concurrently with, etc.) management device 220 establishes a connection with wearable device 210.

In some implementations, management device 220 may determine the power management information based on information stored by management device 220. For example, management device 220 may receive and store power management information associated with wearable device 210, as described above. Here, management device 220 may determine, based on information that identifies wearable device 210 (e.g., provided by wearable device 210), the power management information, stored by management device 220, that corresponds to wearable device 210.

Additionally, or alternatively, management device 220 may determine the power management information based on information provided by another device. For example, management device 220 may send, to administrative device 230, a request to provide the power management information including information that identifies wearable device 210, and management device 220 may determine the power management information based on a response to the request (e.g., when management device 220 has not previously received power management information associated with wearable device 210).

In some implementations, the power management information may include information that identifies a power threshold associated with wearable device 210. As described above, the power threshold may identify a remaining battery life at which management device 220 is to begin managing wearable device 210 based on the power management information.

In some implementations, management device 220 may validate the power management information after management device 220 determines the power information. Validating the power management information may include determining that wearable device 210 may be managed based on the power management information determined by management device 220. Validating the power management information may be useful in a scenario in which a user of management device 220 has modified, altered, edited, or the like, power management information provided by administrative device 230. Validating the power management information via administrative device 230 in this manner may provide for improved remote power management of wearable device 210.

In some implementations, management device 220 may validate the power management information based on providing the determined power management information to administrative device 230. For example, management device 220 may determine power management information, stored by management device 220, that has been received and/or modified based on user input via management device 220. Here, management device 220 may provide the determined power management information to administrative device 230. Administrative device 230 may compare the determined power management information to valid power management information stored by administrative device 230. In this example, if the determined power management information matches (e.g., identically, partially, within a matching threshold, etc.) the valid power management information, then administrative device 230 may provide, to management device 220, information indicating that the determined power management information is valid. Alternatively, if the determined power management information does not match the valid power management information stored by administrative device 230, then administrative device 230 may provide the valid power management information to management device 220. Here, management device 220 may receive the valid power management information provided by administrative device 230, and may manage wearable device 210 based on the valid power management information. In some implementations, the user of management device 220 may be unable to modify power management information received from and/or validated by administrative device 230.

As further shown in FIG. 6, process 600 may include determining whether the remaining battery life of the wearable device satisfies the power threshold (block 630). For example, management device 220 may determine whether the remaining battery life of wearable device 210 satisfies the power threshold identified in the power management information in order to trigger management of wearable device 210 by management device 220. In some implementations, management device 220 may determine whether the remaining battery life satisfies the power threshold after management device 220 determines the remaining battery life of wearable device 210. Additionally, or alternatively, management device 220 may determine whether the remaining battery life satisfies the power threshold after management device 220 determines and/or validates the power management information associated with wearable device 210.

In some implementations, management device 220 may determine whether the remaining battery life satisfies the power threshold based on comparing the remaining battery life and the power threshold. For example, assume that management device 220 determines that wearable device 210 has 55% remaining battery life, and that the power management information identifies a 50% power threshold associated with managing wearable device 210. Here, management device 220 may compare the battery life of wearable device 210 to the power threshold, and may determine that the power threshold is not satisfied (e.g., since 55%>50%).

As another example, assume that management device 220 determines that wearable device 210 has 25% remaining battery life, and that the power management information identifies a 30% power threshold associated with managing wearable device 210. Here, management device 220 may compare the battery life of wearable device 210 to the power threshold, and may determine that the power threshold is satisfied (e.g., since 25%<30%).

In some implementations, management device 220 may determine whether the remaining battery life satisfies multiple power thresholds identified in the power management information. For example, assume that management device 220 determines that wearable device 210 has 25% remaining battery life, and that the power management information identifies a 30% power threshold associated with managing wearable device 210 and a 20% power threshold associated with managing wearable device 210. Here, management device 220 may compare the battery life of wearable device 210 to the 30% power threshold, and may determine that the 30% power threshold is satisfied (e.g., since 25%<30%). Management device 220 may then compare the battery life of wearable device 210 to the 20% power threshold, and may determine that the 20% power threshold is not satisfied (e.g., since 25%>20%). In this example, management device 220 may determine that management device 220 is to manage wearable device 210 based on power management information corresponding to the 30% power threshold (e.g., since the 30% power threshold is satisfied and the 20% power threshold is not satisfied).

As another example, assume that management device 220 determines that wearable device 210 has 8% remaining battery life, and that the power management information identifies a 20% power threshold associated with managing wearable device 210 and a 10% power threshold associated with managing wearable device 210. Here, management device 220 may compare the battery life of wearable device 210 to the 20% power threshold, and may determine that the 20% power threshold is satisfied (e.g., since 8%<20%). Management device 220 may then compare the battery life of wearable device 210 to the 10% power threshold, and may determine that the 10% power threshold is also satisfied (e.g., since 8%<10%). In this example, management device 220 may determine that management device 220 is to manage wearable device 210 based on power management information corresponding to the 10% power threshold (e.g., since the 20% power threshold and the 10% power threshold are both satisfied).

As further shown in FIG. 6, if the power threshold is not satisfied (block 630—NO), then process 600 may include determining the remaining battery life of the wearable device (block 610). For example, management device 220 may determine that the remaining battery life of wearable device 210 does not satisfy the power threshold, and management device 220 may return to block 610 and proceed as described above.

In some implementations, management device 220 may repeatedly determine whether the battery life of wearable device 210 satisfies the power threshold, and may proceed accordingly. In other words, management device 220 may begin managing wearable device 210 only when the battery life of wearable device 210 is less than or equal to at least one power threshold. In this way, management device 220 may detect a power management trigger associated with wearable device 210. A power management trigger may include an event that, when detected, causes management device 220 to manage wearable device 210 based on the power management information associated with wearable device 210.

While implementations described herein may be described in the context of detecting power management trigger associated with a power threshold, in some implementations, management device 220 may detect another type of trigger. For example, management device 220 may detect a trigger associated with a charge event associated with wearable device 210. As a particular example, management device 220 may detect that wearable device 210 becomes fully charged, is unplugged from charging, is charged to a particular amount, or the like, and may start a timer, associated with wearable device 210, that, upon expiration, triggers management device 220 to manage wearable device 210.

As another example, management device 220 may detect a trigger associated with a usage history of wearable device 210. As a particular example, management device 220 may use a machine learning technique to identify a usage pattern (e.g., a period of time with high CPU usage, a period of time during which an application is frequently used, a period of time when wearable device 210 does not move, a period of time when the user does not look at wearable device 210, etc.). Here, management device 220 may identify, based on the usage history, a trigger associated with wearable device 210, and may manage wearable device 210 based on detecting the trigger at a later time. In some implementations, power management may be triggered using a combination of two or more of the above techniques (e.g., based on a power threshold and usage history, etc.).

As further shown in FIG. 6, if the power threshold is satisfied (block 630—YES), then process 600 may include managing the wearable device based on the power management information (block 640). For example, management device 220 may determine that the battery life of wearable device 210 satisfies the power threshold, and management device 220 may manage wearable device 210 based on the power management information.

In some implementations, management device 220 may manage an application, associated with wearable device 210, based on the power management information. For example, management device 220 may manage an application by allowing wearable device 210 to continue executing a designated application, causing wearable device 210 to stop executing a non-designated application, setting a priority associated with closing applications when the battery life of wearable device 210 is at or near 0%, or the like.

Additionally, or alternatively, management device 220 may manage notifications, provided to wearable device 210, based on the power management information. For example, management device 220 may manage the notifications provided to wearable device 210 by providing notifications of a first type and associated with a first application to wearable device 210, by disabling notifications of a second type and associated with the first application to wearable device 210, by disabling any notifications associated with a second application to wearable device 210, or the like.

Additionally, or alternatively, management device 220 may manage alarms, provided to wearable device 210, based on the power management information. For example, management device 220 may manage the alarms provided to wearable device 210 by providing information associated with a first alarm to wearable device 210, by disabling information associated with a second alarm to wearable device 210, by modifying a time period during which wearable device 210 displays information associated with the alarm, or the like.

Additionally, or alternatively, management device 220 may manage display configurations of wearable device 210 based on the power management information. For example, management device 220 may manage the display configurations by causing wearable device 210 to switch to a grayscale mode when providing information for display, by adjusting a brightness configuration associated with the display, by modifying a backlight timer configuration associated with the display, or the like.

Additionally, or alternatively, management device 220 may manage wireless communications of wearable device 210 based on the power management information. For example, management device 220 may manage the wireless communications by enabling or disabling a wireless communication method via which wearable device 210 is capable of sending and/or receiving information, such as GPS, 3G, LTE, WiFi, Bluetooth, NFC, or the like.

In some implementations, management device 220 may manage wearable device 210 based on the power management information until wearable device 210 when the battery life of wearable device 210 is at or near 0% (e.g., when wearable device 210 powers-off). Additionally, or alternatively, management device 220 may continue (e.g., periodically) determining the remaining battery life of wearable device 210, and managing wearable device 210 accordingly (e.g., when the power management information identifies multiple power thresholds, the number of power saving techniques may increase as the remaining battery life gets closer to zero). In this way, management device 220 may manage wearable device 210 in order to improve battery life of wearable device 210.

In some implementations, administrative device 230 may also manage wearable device 210 based on the power management information. For example, administrative device 230 may (e.g., automatically, based on user input) request, from management device 220, information that identifies the remaining battery life of wearable device 210. Here, administrative device 230 may manage wearable device 210 via management device 220 in a manner similar to that described above with regard to management device 220. In this way, administrative device 230 may remotely manage multiple wearable devices 210 (e.g., without directly connecting to the multiple wearable devices 210).

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7A:
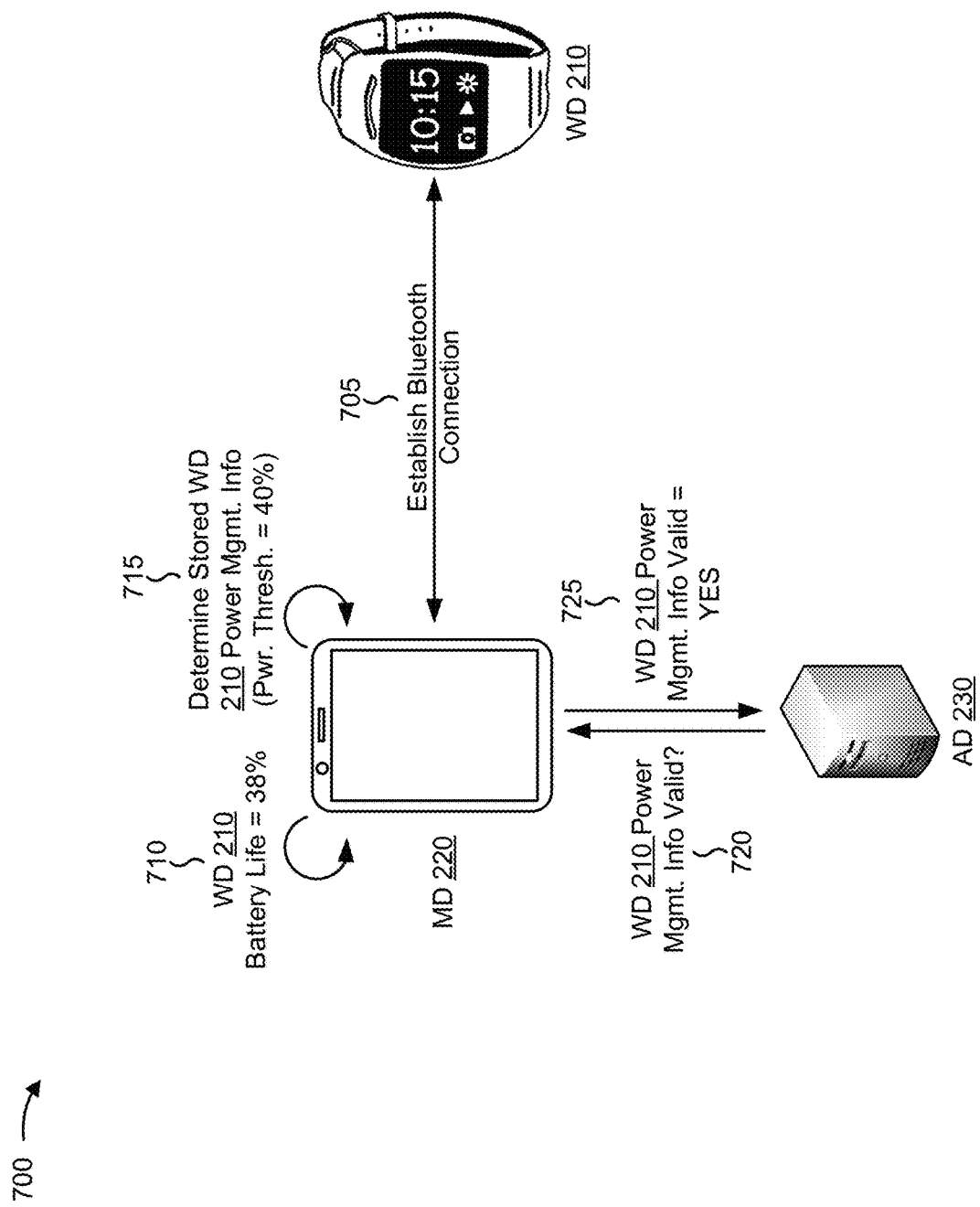
Figure 7B:
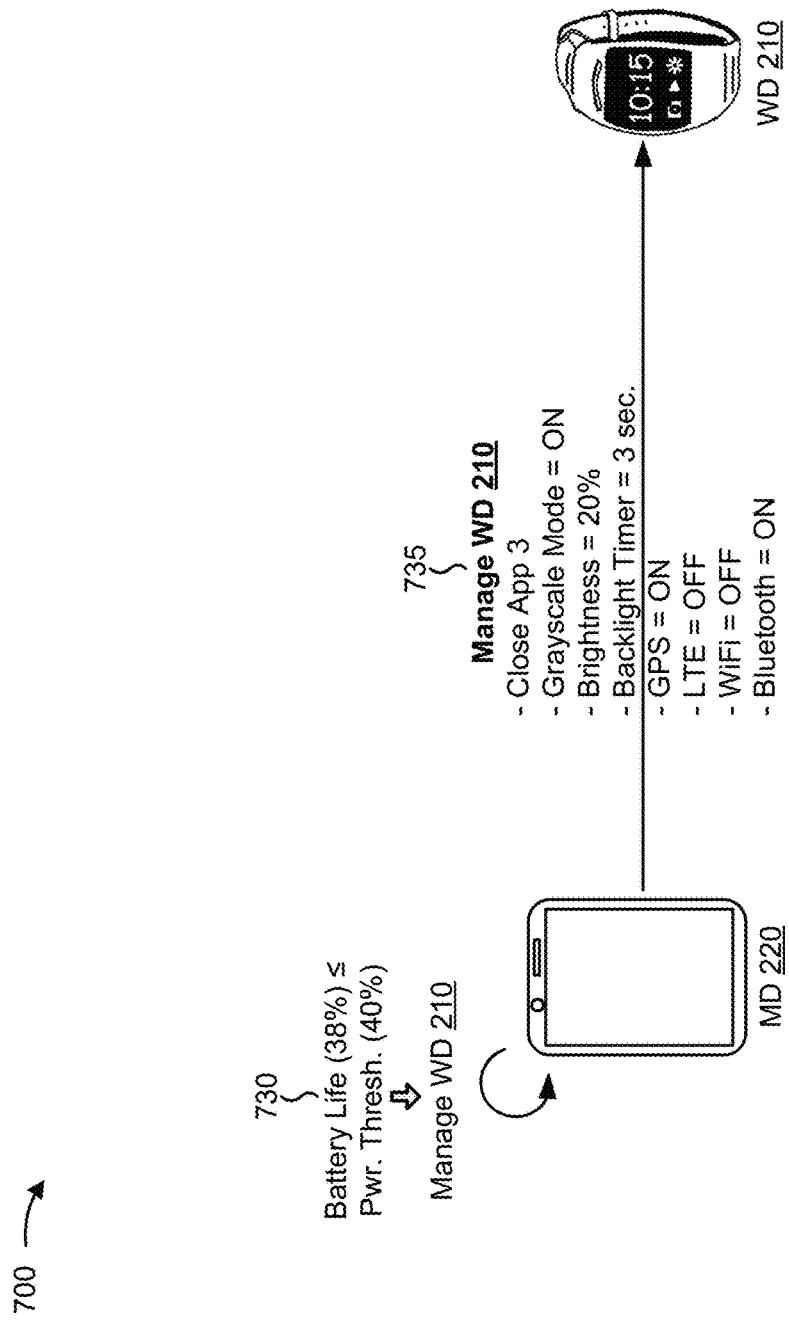

FIGS. 7A-7C are diagrams of an example implementation 700 relating to example process 600 shown in FIG. 6. For the purposes of example implementation 700, assume that management device 220 stores or has access to power management information associated with wearable device 210 as described above with regard to FIG. 5.

As shown in FIG. 7A, and by reference number 705, management device 220 may (e.g., automatically, based on an indication from a user, etc.) establish a Bluetooth connection with wearable device 210. As shown by reference number 710, management device 220 may determine, based on a request provided to wearable device 210, that the remaining battery life of wearable device 210 is 38%. As shown by reference number 715, management device 220 may determine the power management information, associated with wearable device 210, based on the power management information stored by management device 220. As shown, the power management information may identify a 40% battery life power threshold associated with the power management information.

As shown by reference number 720, management device 220 may send, to administrative device 230 associated with wearable device 210, a request associated with validating the power management information stored by management device 220. Here, management device 220 may include information that identifies wearable device 210 and the stored power management information in the request sent to administrative device 230. As shown by reference number 725, assume that administrative device 230 determines that the power management information stored by management device 220 is valid, and provides an indication to management device 220 accordingly.

As shown in FIG. 7B, and by reference number 730, management device 220 may compare the 38% remaining battery life of wearable device 210 to the 40% power threshold identified in the power management information, and may determine that the remaining battery life of wearable device 210 satisfies the power threshold (e.g., since 38%<40%). As such, management device 220 may determine that management device 220 is to manage wearable device 210 based on the power management information.

As shown by reference number 735, management device 220 may manage wearable device 210 based on the power management information. For example, management device 220 may cause wearable device 210 to stop executing a particular application (e.g., Close App 3). Management device 220 may also switch wearable device 210 to a grayscale mode (e.g., Grayscale Mode=ON). Management device 220 may also adjust a brightness configuration of a display screen of wearable device 210 (e.g., Brightness=20%). Management device 220 may also modify a backlight timer configuration associated with the display screen (e.g., Backlight Timer=3 seconds). Management device 220 may also enable wearable device 210 to communicate via GPS and/or Bluetooth, and may disable wearable device 210 from communicating using LTE and WiFi.

As shown in FIG. 7C, and by reference number 740, management device 220 may further manage wearable device 210 by providing, to wearable device 210, notifications associated with another particular application (e.g., App 1). As noted, management device 220 may disable notifications, associated with a different application (e.g., App 2), to wearable device 210, as indicated by the power management information. As shown by reference number 745, management device 220 may also manage wearable device 210 by providing, to wearable device 210, information associated with a particular alarm (e.g., Alarm 1). As noted, management device 220 may disbale information associated with another particular alarm (e.g., Alarm 2) to wearable device 210, as indicated by the power management information. In this way, management device 220 may manage wearable device 210 in order to improve the battery life of wearable device 210.

As indicated above, FIGS. 7A-7C are provided merely as an example. Other examples are possible and may differ from what was described with regard to FIGS. 7A-7C.

Implementations described herein may provide power management for a wearable device in order to improve a battery life of the wearable device (e.g., as compared to a battery life of the wearable device without power management). For example, the battery life of the wearable device may be increased by approximately 33%-40% based on implementing power management techniques described herein.

In some implementations, the battery life of the wearable device may be improved by managing applications, notifications, alarms, use of a display screen, wireless communications, or the like, associated with the wearable device. In some implementations, the power of the wearable device may be locally managed by a management device (e.g., connected to the wearable device) and/or remotely managed by an administrative device (e.g., via a network).

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "group" and "set" are intended to include one or more items (e.g., related items, unrelated items, a combination of related items and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
   a memory; and
   one or more processors to:
     receive power management information associated with a wearable device,
       the power management information including information associated with managing notifications to be provided from the device to the wearable device,
       the power management information identifying a power management trigger associated with the wearable device, and
       the wearable device being different from the device;

detect the power management trigger associated with the wearable device based on a remaining battery life of the wearable device satisfying a first threshold;
prevent, based on detecting the power management trigger and based on the power management information, first transmissions of first notifications by the device to the wearable device,
the first notifications being associated with a first application;
permit, based on detecting the power management trigger and based on the power management information, second transmissions of second notifications by the device to the wearable device,
the second notifications being associated with a second application;
determine that the remaining battery life of the wearable device satisfies a second threshold,
the first threshold being a different threshold level from the second threshold; and
cause, based on the remaining battery life of the wearable device satisfying the second threshold, the device to manage execution of at least two of:
a switch to a grayscale mode by the wearable device,
a modification of a brightness configuration associated with the wearable device,
a modification of a backlight timer configuration associated with the wearable device, or
a disabling of the wearable device from communication using a particular wireless communication method.

2. The device of claim 1, where the one or more processors, after detecting the power management trigger, are further to:
permit third transmissions of third notifications by the device,
the third notifications being associated with the first application.

3. The device of claim 1, where the one or more processors are further to:
receive user input associated with the power management information; and
where the one or more processors, when receiving the power management information, are further to:
receive the power management information based on the user input.

4. The device of claim 1, where the one or more processors, when receiving the power management information, are to:
receive the power management information from an administrative device.

5. The device of claim 1, where the particular wireless communication method includes at least one of:
a global positioning system (GPS) method,
a 3G method,
a long-term evolution (LTE) method,
a WiFi method,
a Bluetooth method, or
a near field communication (NFC) method.

6. The device of claim 1, where the second threshold is less than the first threshold.

7. The device of claim 1, where the power management trigger is a first power management trigger; and
where the one or more processors are further to:
detect a second power management trigger associated with a charge event,
the second power management trigger being detected based on the wearable device becoming fully charged, being unplugged from charging, or being charged to a particular amount, and
the second power management trigger being different than the first power management trigger; and
start a timer, based on the second power management trigger, that, upon expiration of the timer, triggers management device to manage the wearable device.

8. A computer-readable medium storing instructions, the instructions comprising:
one or more instructions that, when executed by one or more processors of a device, cause the one or more processors to:
receive power management information associated with a wearable device,
the power management information including information associated with managing notifications to be provided from the device to the wearable device,
the power management information identifying a power management trigger associated with the wearable device, and
the wearable device being different from the device;
detect the power management trigger associated with the wearable device based on a remaining battery life of the wearable device satisfying a first threshold;
prevent, based on detecting the power management trigger and based on the power management information, first transmissions of first notifications by the device to the wearable device,
the first notifications being associated with a first application;
permit, based on detecting the power management trigger and based on the power management information, second transmissions of second notifications by the device to the wearable device,
the second notifications being associated with a second application;
determine that the remaining battery life of the wearable device satisfies a second threshold,
the first threshold being a different threshold level from the second threshold; and
cause, based on the remaining battery life of the wearable device satisfying the second threshold, the device to manage execution of at least two of:
a switch to a grayscale mode by the wearable device,
a modification of a brightness configuration associated with the wearable device,
a modification of a backlight timer configuration associated with the wearable device, or
a disabling of the wearable device from communication using a particular wireless communication method.

9. The computer-readable medium of claim 8, where the one or more instructions, when executed by the one or more processors, further cause the one or more processors to:
prevent third transmissions of third notifications by the device,
the third notifications being associated with the second application.

10. The computer-readable medium of claim 8, where the one or more instructions, that cause the one or more processors to receive the power management information, cause the one or more processors to:
receive the power management information based on information provided by an administrative device associated with remotely managing the wearable device.

11. The computer-readable medium of claim 8, where the one or more instructions, when executed by the one or more processors, further cause the one or more processors to:
establish a wireless connection with the wearable device.

12. The computer-readable medium of claim 8, where the particular wireless communication method includes at least one of:
a global positioning system (GPS) method,
a 3G method,
a long-term evolution (LTE) method,
a WiFi method,
a Bluetooth method, or
a near field communication (NFC) method.

13. The computer-readable medium of claim 8, where the first threshold is less than the second threshold.

14. The computer-readable medium of claim 8, where the power management trigger is a first power management trigger; and
where the one or more instructions, when executed by the one or more processors, further cause the one or more processors to:
detect a second power management trigger associated with a charge event,
the second power management trigger being detected based on the wearable device becoming fully charged, being unplugged from charging, or being charged to a particular amount, and
the second power management trigger being different than the first power management trigger; and
start a timer, based on the second power management trigger, that, upon expiration of the timer, triggers management device to manage the wearable device.

15. A method, comprising:
receiving, by a device, power management information associated with a wearable device,
the power management information including information associated with managing notifications to be provided from the device to the wearable device,
the power management information identifying a power management trigger associated with the wearable device, and
the wearable device being different from the device;
detecting, by the device, the power management trigger associated with the wearable device based on a remaining battery life of the wearable device satisfying a first threshold;
preventing, by the device, based on detecting the power management trigger, and based on the power management information, first transmissions of first notifications by the device to the wearable device,
the first notifications being associated with a first application;
permitting, by the device, based on detecting the power management trigger, and based on the power management information, second transmissions of second notifications by the device to the wearable device,
the second notifications being associated with a second application;
preventing, by the device, based on detecting the power management trigger, and based on the power management information, third transmissions of third notifications by the device to the wearable device,
the third notifications being associated with the second application;
determining, by the device, that the remaining battery life of the wearable device satisfies a second threshold,
the first threshold being a different threshold level from the second threshold; and
causing, by the device and based on the remaining battery life of the wearable device satisfying the second threshold, management of an execution of at least two of:
a switch to a grayscale mode by the wearable device,
a modification of a brightness configuration associated with the wearable device,
a modification of a backlight timer configuration associated with the wearable device, or
a disabling of the wearable device from communication using a particular wireless communication method.

16. The method of claim 15, further comprising:
receiving user input associated with the power management information; and
where receiving the power management information comprises:
receiving the power management information based on the user input.

17. The method of claim 15, where receiving the power management information comprises:
receiving the power management information from an administrative device.

18. The method of claim 15, further comprising:
establishing a wireless connection with the wearable device.

19. The method of claim 15, where the second threshold is less than the first threshold.

20. The method of claim 15, where the power management trigger is a first power management trigger; and
where the method further comprises:
detecting a second power management trigger associated with a charge event,
the second power management trigger being detected based on the wearable device becoming fully charged, being unplugged from charging, or being charged to a particular amount, and
the second power management trigger being different than the first power management trigger; and
starting a timer, based on the second power management trigger, that, upon expiration of the timer, triggers management device to manage the wearable device.

* * * * *